(12) United States Patent
Gupta et al.

(10) Patent No.: US 8,986,822 B2
(45) Date of Patent: Mar. 24, 2015

(54) OIL IMPERVIOUS DEVICE WITH HIGH WATER FLOW RATE

(75) Inventors: Rakesh Kumar Gupta, Kingsport, TN (US); Daniel Parker, Lousiville, KY (US); Branden Michael Baer, Louisville, KY (US); Thomas Russell Downs, Crestwood, KY (US)

(73) Assignee: C. I. Agent Solutions, Louisville, KY (US)

( * ) Notice: Subject to any disclaimer, the term of this patent is extended or adjusted under 35 U.S.C. 154(b) by 9 days.

(21) Appl. No.: 13/525,408

(22) Filed: Jun. 18, 2012

(65) Prior Publication Data

US 2013/0337252 A1 Dec. 19, 2013

(51) Int. Cl.
*B32B 5/02* (2006.01)

(52) U.S. Cl.
CPC . *B32B 5/02* (2013.01); *B32B 5/024* (2013.01); *B32B 5/026* (2013.01); *B32B 5/022* (2013.01)
USPC ............ 428/220; 442/318; 442/381; 442/268

(58) Field of Classification Search
CPC .......... B32B 5/02; B32B 5/022; B32B 5/026; B32B 5/024
USPC ............................ 428/220; 442/318, 381, 268
See application file for complete search history.

(56) References Cited

U.S. PATENT DOCUMENTS

| | | |
|---|---|---|
| 4,626,132 A | 12/1986 | Allen |
| 4,750,775 A | 6/1988 | Miller |
| 4,798,754 A | 1/1989 | Tomek |
| 5,232,310 A | 8/1993 | Wirkala |
| 5,833,862 A * | 11/1998 | Holland .................. 210/690 |
| 5,849,198 A | 12/1998 | Sharpless |
| 5,863,440 A | 1/1999 | Rink et al. |
| 5,904,842 A | 5/1999 | Billias et al. |
| 5,925,241 A | 7/1999 | Aldridge et al. |
| 6,106,707 A | 8/2000 | Morris et al. |
| 6,143,172 A | 11/2000 | Rink et al. |
| 6,231,758 B1 | 5/2001 | Morris et al. |
| 6,485,639 B1 | 11/2002 | Gannon et al. |
| 6,503,390 B1 | 1/2003 | Gannon |
| 6,841,077 B2 | 1/2005 | Gannon et al. |

OTHER PUBLICATIONS

Material Safety Data Sheet; Product Name: Nylon 6,6 Spunbond Fabric: Cerex (R); Cerex Advanced Fabrics, Inc., 610 Chemstrand Road, Cantonment, FL 32533 USA; Dated: May 20, 2010.
Material Safety data Sheet; Product Name: C. I. Agent (R) Polymer; Chemical Family: Styrene-Butadiene-Styrene Polymer; Product Family: Thermoplastic Elastomers; C. I. Agent Solutions, LLC, 11760 Commonwealth Drive, Louisville, KY 40299 USA; Dated: Apr. 19, 2010.

* cited by examiner

*Primary Examiner* — Peter Y Choi
*Assistant Examiner* — Vincent A Tatesure

(57) ABSTRACT

A device or method to prevent penetration of oil and petroleum products while allowing high water flow rate is provided. Such device or method is beneficial in controlling the contamination of surrounding soil from accidental leak of hydrocarbons such as oil and other petroleum products from equipment or storage vessels containing such materials. The containment systems equipped with these devices will allow the rain water to flow through while providing barrier to oil and petroleum products.

3 Claims, No Drawings

OIL IMPERVIOUS DEVICE WITH HIGH WATER FLOW RATE

FIELD OF THE INVENTION

This invention is in the field of systems and methods for preventing accidental oil or other hydrocarbons spills from passing through drains and barriers while allowing high rate of water flow.

BACKGROUND OF THE INVENTION

Existing oil impervious devices used as drain plugs or barrier booms are good in stopping the flow of oil such as transformer or compressor oils but also significantly restrict the flow of water such as rain water. In the applications where catch pans or ponds are installed under the oil containing equipments, such as transformers and compressors, it is desirable to equip the drains of these catch pans or ponds with oil impervious devices to block any accidental oil leakage in to the surrounding ground. The existing oil impervious devices available for these applications are deficient in permitting the rain water from draining at a desirable rate which can cause water overflow as well as accidental oil overflow. Therefore, it is desirable to have oil impervious devices which can allow high rate of water flow through them while maintaining its oil impervious property.

REFERENCES (US PATENTS)

U.S. Pat. No. 4,626,132 December 1986 Allen
U.S. Pat. No. 4,750,775 June 1988 Miller
U.S. Pat. No. 4,798,754 January 1989 Tomek
U.S. Pat. No. 5,232,310 August 1993 Wirkala
U.S. Pat. No. 5,833,862 November 1998 Holland
U.S. Pat. No. 5,849,198 December 1998 Sharpless
U.S. Pat. No. 5,863,440 January 1999 Rink et al.
U.S. Pat. No. 5,904,842 May 1999 Billias et al.
U.S. Pat. No. 5,925,241 July 1999 Aldridge et al.
U.S. Pat. No. 6,106,707 August 2000 Morris et al.
U.S. Pat. No. 6,143,172 November 2000 Rink et al.
U.S. Pat. No. 6,231,758 May 2001 Morris et al.
U.S. Pat. No. 6,485,639 November 2002 Gannon et al.
U.S. Pat. No. 6,503,390 January 2003 Gannon
U.S. Pat. No. 6,841,077 January 2005 Gannon et al.

ADDITIONAL REFERENCES (PUBLISHED LITERATURE)

1. Material Safety Data Sheet; Product: Nylon 6.6 Spunbond Fabric: CEREX®; CEREX Advanced Fabrics, Inc., 610 Chemstrand Road, Cantonment, Fla. 32533 USA; Dated: May 20, 2010
2. Material Safety Data Sheet; Product Name: C. I. Agent ®; Chemical Family: Styrene-Butadiene-Styrene Polymer; Product Family: Thermoplastic Elastomers; C. I. Agent Solutions©, LLC, 11760 Commenwealth Drive, Louisville, Ky. 40299 USA; Dated: Apr. 19, 2010

DESCRIPTION OF RELATED ART

Oil and other hydrocarbon spill containment systems are built to trap the potential spilled hydrocarbon but allow water to pass through at a very low rate causing these containment systems to fill up with rain water etc. and present a high risk of overflow. These devices are essentially pipes filled with oil absorbing polymers and fillers such as sand. The amount of filling material required to provide the foolproof oil or other hydrocarbon containment renders these devices to be very restrictive to water flow. Other devices use the oil absorbent materials, which may provide higher water flow rate, do not provide the complete barrier to oil or hydrocarbons.

DESCRIPTION OF INVENTION

An oil impervious device with high water flow rate has been developed. This novel development permits water flow rates of greater than 100 liters/minute/square meter (liters/minute/sq. m.) surface area/cm thickness. Actually, these devices can provide water flow rate greater than 300 liters/minute/sq. m. surface area/cm thickness.

Following examples illustrate this invention.

CONTROL EXAMPLE

A composite fabric structure is made using 2 layers of 15 gsm (grams per square meter basis weight) polypropylene spunbond/meltblown/spunbond nonwoven fabric with 480 gms of CI Agent oil solidifying polymer available from CI Agent Solutions, Louisville, Ky. between the 2 layers using the sonic bonding technique, thereby, providing 1.59 cms by 1.59 cms diamond shaped pockets containing the said oil solidifying polymer between the 2 layers of nonwoven fabric. Five layers of this composite fabric which had total thickness of 1 cm was tested in a filtration device with the filtration area of 11.4 sq. cm. (1.5 inch diameter). A water flow rate of 6.53 ml/minute was observed through these five layers at 2" water head which is equivalent to a water flow rate of 5.7 liters/minute/sq. m. surface area/cm thickness. This water flow rate is very low and undesirable in commercial applications. Transformer oil was completely blocked by these five layers.

COMPARATIVE EXAMPLE 1

A composite fabric structure was made using 2 layers of 35 gsm Cerex Nylon spunbond nonwoven fabric available from Cerex Advanced Fabrics, Inc., Pensacola, Fla. with 400 gsm of CI Agent oil solidifying polymer available from CI Agent Solutions, Louisville, Ky. between the 2 layers. Five layers of this composite fabric which had total thickness of about 1 cm was tested in a filtration device with the filtration area of 11.4 sq.cm. (1.5 inch diameter). A water flow rate of 672 ml/minute was observed at 2" water head through these five layers which is equivalent to a water flow rate of 589 liters/minute/sq. m. surface area/cm thickness. This water flow rate is very high and desirable in commercial applications. Transformer oil was completely blocked by these five layers.

COMPARATIVE EXAMPLE 2

A composite fabric structure was made using 2 layers of 35 gsm Surefil Polyester/Rayon nonwoven fabric available from Hanes Industries, Conover, N.C. with 400 gsm of CI Agent oil solidifying polymer available from CI Agent Solutions, Louisville, Ky. between the 2 layers. Five layers of this composite fabric which had total thickness of about 1 cm were tested in a filtration device with the filtration area of 17.8 sq.cm (1.875 inch diameter). A water flow rate of 840 ml/minute at 2" water head was observed through these five layers which is equivalent to a water flow rate of 471 liters/minute/sq. m. surface area/cm thickness. This water flow rate is very high and desirable in commercial applications. Transformer oil was completely blocked by these five layers.

COMPARATIVE EXAMPLE 3

Composite fabric structures were made using 2 layers of 35 gsm Cerex Nylon spunbond nonwoven fabric available from Cerex Advanced Fabrics, Inc., Pensacola, Fla. and differing amounts of CI Agent oil solidifying polymer available from CI Agent Solutions, Louisville, Ky. in between the nonwoven fabrics using the sonic bonding technique, thereby, providing 1.59 cms by 1.59 cms diamond shaped pockets containing the said oil solidifying polymer between the 2 layers of nonwoven fabric. The oil flow blocking and water flow properties were measured using 15 cms liquid head.

COMPARATIVE EXAMPLE 3A

The composite fabric structure containing 220 gsm oil solidifying polymer provided oil flow barrier with only 3 layers of this structure. The water flow rates of 860 liters/min/sq.m. surface area/cm thickness and 410 liters/min/sq.m. surface area/cm thickness were respectively observed through 4 and 6 layers of this structure which had total thickness of about 1 cm.

COMPARATIVE EXAMPLE 3B

The composite fabric structure containing 180 gsm oil solidifying polymer provided oil flow barrier with only 4 layers of this structure. The water flow rates of 1000 liters/min/sq.m./cm was observed through 6 layers of this structure which had total thickness of about 1 cm.

These examples illustrate the novelty of present invention and are not limiting to its scope and applicability.

What we claim:

1. An oil impervious device, consisting of at least 2 layers of a composite fabric structure, wherein said composite fabric structure consists of at least 2 fabric layers and at least 180 grams per square meter of an oil solidifying polymer comprising styrene butadiene styrene polymer positioned between said layers of fabric, Wherein said composite fabric structure consists of diamond shaped pockets having each side dimension of about 1.59 centimeters and containing said oil solidifying polymer within the pockets, Wherein said fabric layers comprise nylon fibers, and Wherein said device provides a water flow rate of greater than 100 liters/minute/sq. m. surface area/cm thickness and completely blocks oil.

2. An oil impervious device of claim 1 that provides a water flow rate of greater than 300 liters/minute/sq. m. surface area/cm thickness.

3. An oil impervious device of claim 2 consisting of at least 3 layers of said composite fabric structure.

* * * * *